March 3, 1936.  G. W. BAKER  2,033,022
PORTABLE PRECOOLING EQUIPMENT
Filed March 28, 1935  2 Sheets-Sheet 1
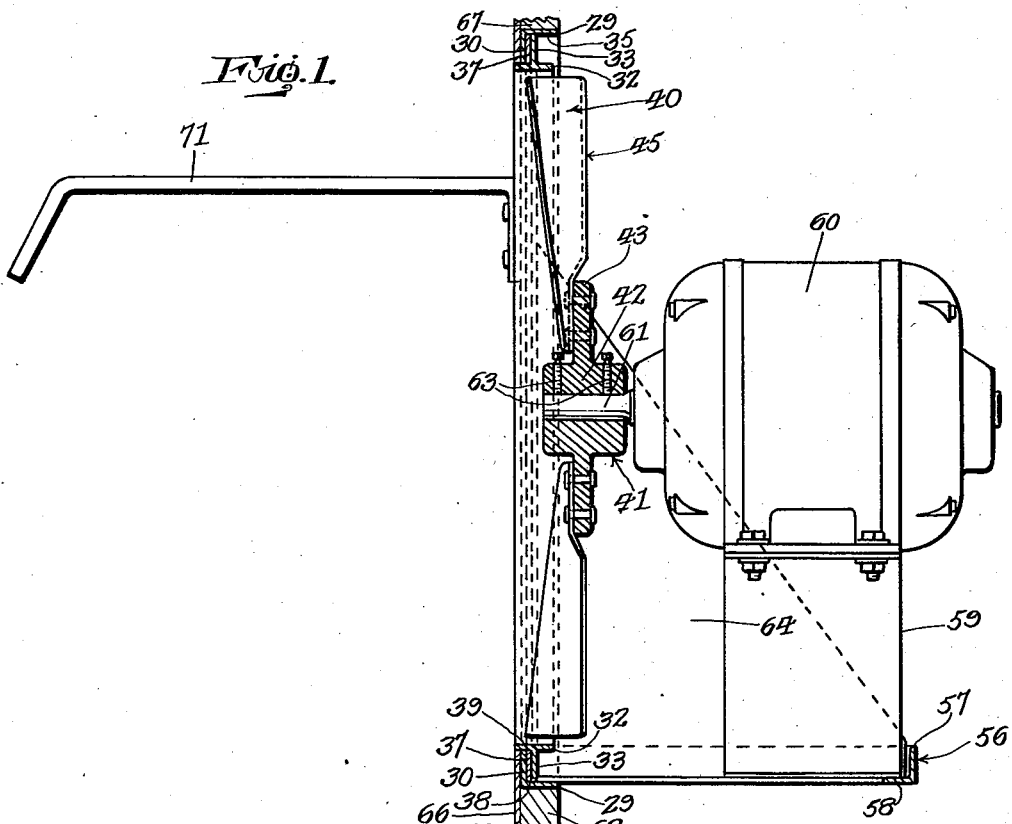
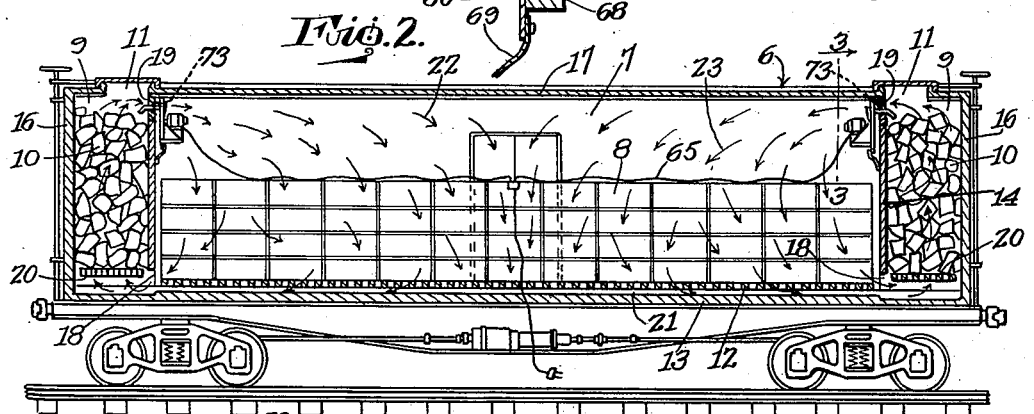
Inventor
George Walter Baker
Geo. P. Kimmel
Attorney March 3, 1936.  G. W. BAKER  2,033,022
PORTABLE PRECOOLING EQUIPMENT
Filed March 28, 1935  2 Sheets-Sheet 2
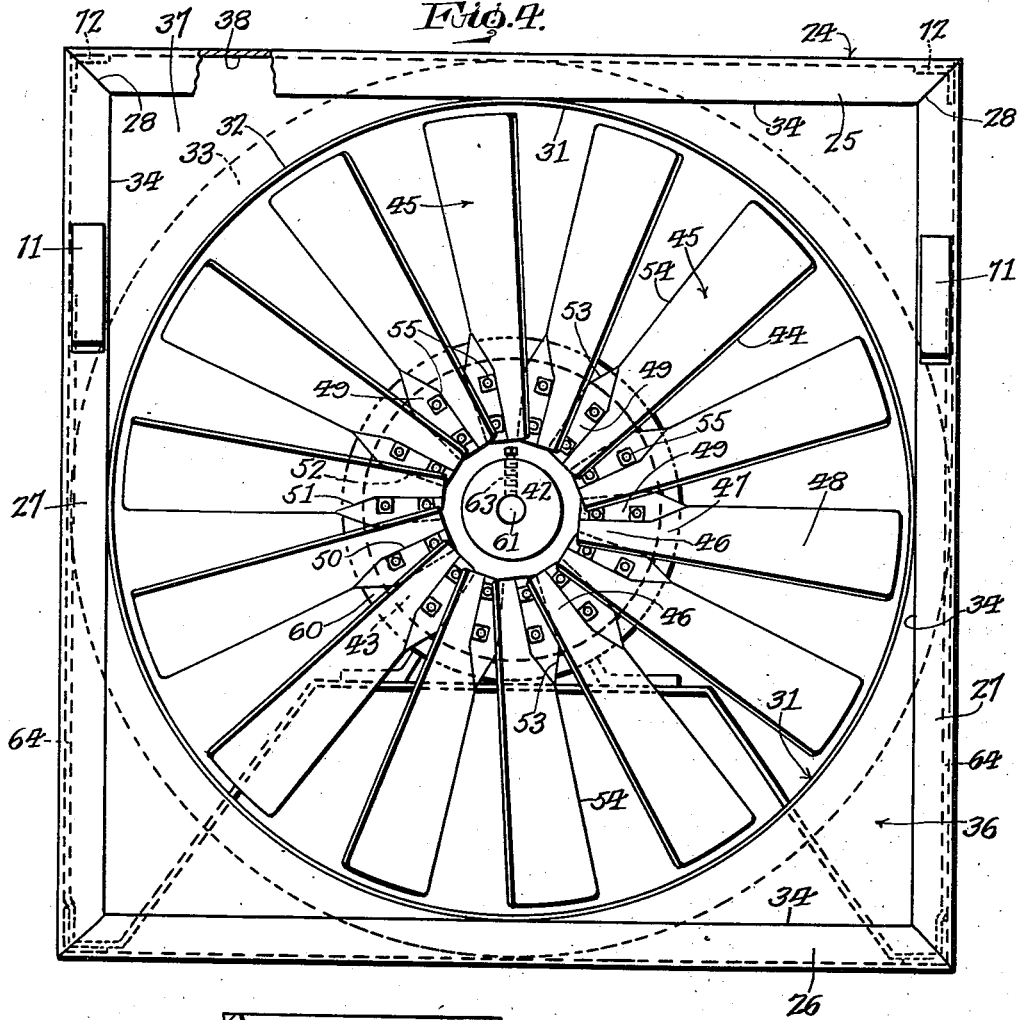
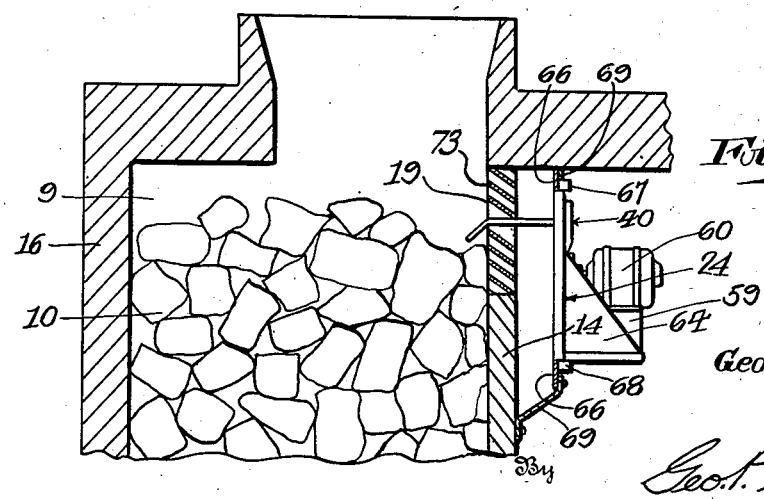
Inventor
George Walter Baker
By Geo. P. Kimmel
Attorney Patented Mar. 3, 1936

2,033,022

UNITED STATES PATENT OFFICE 2,033,022

PORTABLE PRECOOLING EQUIPMENT

George Walter Baker, Jacksonville, Fla., assignor to American Coolair Corporation, Jacksonville, Fla.

Application March 28, 1935, Serial No. 13,554

4 Claims. (Cl. 98—6)

This invention relates to a portable pre-cooling equipment designed primarily for use in connection with refrigerating cars employed for the transportation of fruits and vegetables, but it is to be understood that a cooling equipment, in accordance with this invention, is for use in connection with any purpose for which it may be found applicable.

The invention has for its object to provide, in a manner as hereinafter set forth, an equipment of the class referred to for causing an efficient pre-cooling of the contents of the car to an extent whereby such contents will be preserved in a thoroughly satisfactory state when the car reaches its point of destination.

A further object of the invention is to provide, in a manner as hereinafter set forth, an equipment of the class referred to for association with the refrigerant stored in a refrigerating car for setting up an efficient pre-cooling of the contents of the car to preserve them during transportation.

A further object of the invention is to provide, in a manner as hereinafter set forth, a portable pre-cooling equipment for the purpose referred to which may be expeditiously installed within and removed from a refrigerating car when occasion requires.

A further object of the invention is to provide, in a manner as hereinafter set forth, an equipment of the class referred to for association with the refrigerant stored in a refrigerating car for setting up a thoroughly efficient pre-cooling of the contents of the car by the circulation of cooled air through the storage space for the contents of the car and by the attack of such cooled air upon the contents, whether the articles being shipped are boxed, crated, packed or loose.

A further object of the invention is to provide, in a manner as hereinafter set forth, a portable pre-cooling equipment for refrigerating cars and which, when active, will give maximum cooling efficiency.

Further objects of the invention are to provide, in a manner as hereinafter set forth, a portable pre-cooling equipment for the purpose referred to which is simple in its construction and arrangement, strong, durable, compact, readily installed when occasion requires, thoroughly efficient in its use and comparatively inexpensive to set up.

To the above ends essentially and to others which may hereinafter appear, the invention consists of such parts and such combination of parts which fall within the scope of the invention as claimed.

In the drawings:

Figure 1 is a fragmentary view, in vertical section, of the pre-cooling equipment in accordance with this invention, Figure 2 is a longitudinal sectional view of a refrigerating car packed with cases of goods for transportation, and showing the adaptation therewith of a pair of pre-cooling equipments in accordance with this invention, Figure 3 is a fragmentary view, in section, on the line 3—3, Figure 2, Figure 4 is an elevation, upon an enlarged scale, looking at the intake end of the equipment, and Figure 5 is an enlarged sectional detail looking towards one side of the equipment.

In the drawings there is illustrated a refrigerating car 6 having a storage or receiving compartment 7 for the articles 8 which are to be transported. Each end of car 6 has a chamber 9 for the storage of a refrigerant 10, such as ice. A normally closed filling opening 11 is provided for each chamber 9. The compartment 7 has a lattice-like member or grating 12 arranged over and in spaced relation to the bottom 13 of the car 6. Each chamber 9 is provided by a vertical partition 14 coacting with a part of each of the side walls 15 and an end wall 16 of the car. The partitions 14 extend to the roof 17 and are cut out at their lower ends to form air intakes 18 for the chambers 9. The partitions 14, in proximity to their upper ends, are formed with rectangular openings 19 providing cooled air outlets for the chambers 9. The refrigerant 10 is supported upon a grating 20 arranged over and spaced from car bottom 13 of the car. The spacing of the lattice-like member or grating 12 from the car bottom 13 forms an air passage 21 opening into the intakes 18. The circulation of the cooled air with respect to the articles 8 is indicated by the arrows 22, 23. The form of car, as referred to, is of known construction and is illustrated, by way of example, for the purpose of showing, installed therewith, a pair of portable pre-cooling equipments in accordance with this invention.

The equipment includes a square frame 24 formed of top, bottom and side members 25, 26, 27 respectively of angle form and which are mitered, as at 28, to provide for the ends thereof abutting. Each of said members includes an outer and an inner leg 29, 30 respectively, disposed at right angles to each other. Arranged within the frame 24 is an annulus 31 having its body of T-shape cross section to form a head 32 and a stem 33. The head 32 seats against the central portion of the edge 34 of the inner leg 30 of each of the members of the frame 24. The stem 33 seats against the central portion of the inner face 35 of the outer leg 29 of each of the members of frame 24. The stem 33 is spaced from the front face of the said legs 30. A closure 36 is provided for the space between the frame 24 and annulus 31, and which is in the form of a flat apertured partition 37 having its outer edge 38 of square and its inner edge 39 of circular outline. The closure 36 is arranged between the legs 30 and stem 33. The outer edge 38 of closure 36 seats against the inner face of legs 29. The inner edge 39 of closure 36 bears against the outer face of head 32. The closure 36 is arranged in abutting engagement with respect to the frame 24 and annulus 31. The head 32 extends outwardly with respect to the edge 34 of the inner legs 30. The annulus 31 provides a housing for the blades 40 of a fan 41 employed to provide for the circulation of cooled air through the compartment 7 and a chamber 9. The frame 24 provides a support for annulus 31, and the closure 36 prevents the passage of air between the annulus and frame.

The fan 41 includes a hub 42 provided with an annular peripheral flange 43 to the rear face of which are secured the blades 40. These latter are of like construction and each has a straight follower lengthwise edge 44. Each blade has its body, from end to end thereof, formed with a portion 45 disposed throughout at an outward inclination with respect to and spaced from the flange 43. The portion 44 consists of an inner end stretch 46, an intermediate stretch 47 and an outer end stretch 48 of greater length than said other stretches. Each blade has its body formed with a flat apertured coupling portion 49 which is inset with respect to, arranged at and merges into the inner sides of stretches 46, 47. The inner side 50 of stretch 46 inclines outwardly from its inner to its outer end. The inner side 51 of stretch 47 inclines outwardly from its inner to its outer end at a greater inclination than that of the leading side 50 of the stretch 46. The leading lengthwise edge of the body of each blade is formed with an inner edge portion 52 extending at an outward inclination from its inner to its outer end, an intermediate edge portion 53 extending inwardly at an inclination from its inner to it outer end and an outer edge portion 54 extending at an outward inclination from its inner to its outer end. The edge portion 52 is of greater length than the edge portion 53. The edge portion 54 is of materially greater length than the edge portion 52. The stretch 46 gradually increases in width from its inner to its outer end. The stretch 47 gradually increases in width from its inner to its outer end. The stretch 48 gradually increases in width from its inner to its outer end. The portion 49, from its inner end, gradually increases in width for the major part of its length. The remaining part of portion 49 decreases in width to form a point at its outer end. The portion 45 of the blade is disposed throughout at an outward inclination with respect to the coupling portion 49. The latter has its inner face bearing against one side of and is anchored to the flange 43 by the holdfast devices 55. The blades are radially disposed with respect to the hub 42, and when so arranged, the stretch 46 of a leading blade overlaps a portion of the length of the coupling portion 49 of a follower blade.

The hub 42 has the major portion of its length arranged forwardly of the annulus 31. The blades have lengthwise portions thereof clear of the annulus 31. The hub 42 is spaced outwardly from the annulus 31.

Mounted in, anchored to and extending outwardly from the bottom of frame 24 is a support 56 in the form of a U-frame having its body of angle form in vertical section to provide a vertical leg 57 and a horizontal leg 58 extending inwardly from the lower end of leg 57. Positioned within and extending upwardly from support 56 is a base 59 upon which is secured an electric motor 60 having its shaft 61 extended into the hub 42. Holdfast means 63 are employed for anchoring shaft 61 to hub 42. Arranged in the frame 24 and support 56 are spaced parallel, upstanding, triangular shaped bracing plates 64 between which the base 59 and motor 60 are arranged. Controllable flexible extension power circuit connections 65 lead to the motor 60.

The frame 24 is partly seated in an opening in a vertically disposed wall board 66 anchored to the top and sides of the car. The board 66 opposes in spaced relation a partition 14. The fan 41 opposes in spaced relation the outlet 19. Horizontally disposed spaced parallel superposed bars 67, 68 are secured to the wall board 66. The frame 24 is arranged between the bars 67, 68 supported by bar 68 and bears against bar 67. A water proof air tight canvas 69 is provided for closing the intake to the space between the partition 14 and the wall board 66. The canvas 69 is anchored to the wall board adjacent the bars 67, 68. The canvas 69 is formed with an enlarged opening 70 through which extends the frame 24 and bars 67, 68.

Secured to the sides of frame 24 and extending through the louvers in the outlet 19 are angle-shaped hangers 71. The hangers 71 coact with the louvers for retaining the frame 24 between the bars 67, 68 or, in other words, couples frame 24 to a partition 14. The members 25, 26 and 27 of frame 24 are secured together by angle pieces 72 welded thereto. The louvers are indicated by reference numeral 73 on the drawings. The hangers having a downturned end part pass through the louvers and hook over the partition to maintain the equipment in position. There is in this respect an essential coaction between the louvers and the hangers.

What I claim is:

1. In a portable pre-cooling equipment for the purpose set forth, an upstanding partition formed with a louvered outlet for cooled air, an upstanding element opposing in spaced relation said outlet, said element being provided with an opening, an upstanding structure mounted in and extended outwardly from said opening, said structure being formed with a circular opening, a fan extending in said circular opening to oppose said outlet, a motor for driving the fan spaced from said structure, a base for said motor, a support extended from the bottom of said structure for said base, means carried by said element for closing the space between it and said partition, and angle-shaped hangers extending from said structure through said partition and coacting with said louvered outlet for coupling said structure to said partition.

2. In a portable pre-cooling equipment, a square frame, an annulus positioned within and having spaced points thereof abutting spaced points on the inner face of the frame, means interposed between and having its edges bearing throughout against the annulus and frame for closing the openings formed between the frame and annulus, a fan extending into said annulus from the front of the latter, a motor for operating the fan, an upstanding base for the motor spaced from the frame, a support for the base, said support mounted in the bottom of the frame and extending outwardly at right angles to said bottom, said fan being clear of said annulus, and angle-shaped coupling hangers for extending rearwardly from and secured at one end to the sides of said frame.

3. In a portable pre-cooling equipment, an upstanding element formed with an opening, an upstanding structure arranged in said opening and having a fan receiving opening, a fan extending into said receiving opening, driving means for and supporting the fan, said means arranged forwardly of and spaced from said structure, means extended outwardly from the bottom of said structure for supporting said driving means, a water proof air tight flexible body secured to and depending below said element, and hangers secured to said structure for maintaining the latter in an upstanding position.

4. In a portable pre-cooling equipment, an upstanding element formed with an opening, an upstanding structure arranged in said opening and having a fan receiving opening, a motor driven fan, means extended from the bottom of said structure for supporting said fan, anchoring means opposing said element and rearwardly extending hangers secured to said structure and engaging with said anchoring means for maintaining the structure in an upstanding position when the equipment is in operative position with respect to its place of work.

GEORGE WALTER BAKER.